United States Patent [19]

Kurachi

[11] Patent Number: 5,073,159
[45] Date of Patent: Dec. 17, 1991

[54] VEHICLE TRANSMISSION
[75] Inventor: Nobuhide Kurachi, Maebashi, Japan
[73] Assignee: Nippon Seiko Kabushiki Kaisha, Tokyo, Japan
[21] Appl. No.: 516,776
[22] Filed: Apr. 30, 1990
[30] Foreign Application Priority Data May 16, 1989 [JP] Japan .................... 1-120430

[51] Int. Cl.⁵ .............................. F16H 00/00
[52] U.S. Cl. .................. 475/216; 475/200; 475/900
[58] Field of Search ............ 475/200, 206, 209, 214, 475/215, 216, 900

[56] References Cited

U.S. PATENT DOCUMENTS

| | | | |
|---|---|---|---|
| 2,545,152 | 3/1951 | Haidegger | 475/216 X |
| 4,693,134 | 9/1987 | Kraus | 475/216 |
| 4,726,256 | 2/1988 | von Kaler et al. | 475/900 X |
| 4,781,259 | 11/1988 | Yamaoka et al. | 475/900 X |
| 4,856,371 | 8/1989 | Kemper | 475/215 |
| 4,862,767 | 9/1989 | Hauser | 475/206 X |
| 4,872,371 | 10/1989 | Fellows | 475/216 |
| 4,885,955 | 12/1989 | Kraus | 475/216 X |

FOREIGN PATENT DOCUMENTS 62-71465 5/1987 Japan .

*Primary Examiner*—Dwight Diehl
*Attorney, Agent, or Firm*—Shapiro and Shapiro

[57] ABSTRACT

A vehicle transmission comprises a hollow casing, an input shaft, a gear assembly, parallel first to fourth power transmitting shafts provided in the casing, first and second clutch devices, a toroidal type infinitely variable transmission, first to ninth gears, and a power taking-off device.

23 Claims, 3 Drawing Sheets

VEHICLE TRANSMISSION

BACKGROUND OF THE INVENTION

This invention relates to a vehicle transmission which can be utilized as a transmission for a light vehicle such as a lawn mower for riding, a snow removing machine, an electric automobile or a forklift.

As the transmission of a light vehicle that runs at a low speed, such as a lawn mower for riding, a snow removing machine, an electric automobile or a forklift, use has heretofore been made of a gear type transmission of the type used in ordinary automobiles, as well as a rubber belt type transmission or a hydraulic pump motor type transmission.

In the case of the gear type transmission, not only the speed changing operation is cumbersome, but also, in the case of a light vehicle which is light in weight, the shock during a speed change becomes great, and this is undesirable.

In the case of the rubber belt type transmission, durability is low and moreover, the response during a speed change is not always good.

In the case of the hydraulic pump motor type transmission, the low efficiency results in a great power loss in the transmission portion, and this leads to performance of the vehicle (including fuel consumption).

SUMMARY OF THE INVENTION

An object of the present invention is to solve the problems as noted above and to provide a transmission which is good in operability and responsiveness as well as sufficient in durability and good in efficiency.

A vehicle transmission according to one of the principal aspects of the present invention may comprise a hollow casing, an input shaft, a gear assembly, parallel first to fourth power transmitting shafts provided in said casing, first and second clutch means, a toroidal type infinitely variable transmission, first to ninth gears, and power taking-out means.

The input shaft is provided through said hollow casing, and a driving force can be transmitted from said input shaft to said first power transmitting shaft by the gear assembly, which is provided between an end of said input shaft and said first power transmitting shaft rotatably supported in said casing.

The second power transmitting shaft is rotatably supported in said casing in parallelism to said first power transmitting shaft, and the second gear supported on the outer peripheral surface of said second power transmitting shaft against rotation relative to said second power transmitting shaft and the first gear supported on the outer peripheral surface of said first power transmitting shaft against rotation relative to said first power transmitting shaft are brought into meshing engagement with each other.

The toroidal type continuously variable transmission is supported in said casing coaxially with said second power transmitting shaft, and the first clutch means is provided between an input side disk of said toroidal type continuously variable transmission and said second power transmitting shaft.

The third power transmitting shaft is rotatably supported in said casing in parallelism with the center of rotation of an output side disk of said toroidal type continuously variable transmission, and the fourth gear supported on the outer peripheral surface of said third power transmitting shaft against rotation relative to said third power transmitting shaft and the third gear supported on the output side disk of said toroidal type continuously variable transmission against rotation relative to the output side disk are brought into meshing engagement with each other.

In addition to said fourth gear, the fifth gear and the sixth gear are supported on the outer peripheral surface of said third power transmitting shaft against rotation relative to the third power transmitting shaft.

The fourth power transmitting shaft is rotatably supported in said casing in parallelism to said third power transmitting shaft, and the seventh and ninth gears are supported around said fourth power transmitting shaft for rotation relative to said fourth power transmitting shaft.

The seventh gear is in meshing engagement with said fifth gear, and the ninth gear is in meshing engagement with said sixth gear through the eighth gear.

The second clutch means is provided between said fourth power transmitting shaft and said seventh gear and said ninth gear, and has the function of alternatively coupling said seventh and said ninth gear to said fourth power transmitting shaft.

Further, the power taking-off means has the function of freely taking out the rotative driving force of said fourth power transmitting shaft and moving a vehicle by the taken-out rotative driving force.

The embodiment of the present invention constructed as described above operates in the following manner.

The rotative driving force transmitted from the engine to the input shaft is transmitted to the first power transmitting shaft through the gear assembly, and is further transmitted to the second power transmitting shaft through the first and second gears.

The rotative driving force transmitted to the second power transmitting shaft is further transmitted to the input side disk of the toroidal type continuously variable transmission through the first clutch means, and along therewith, the output side disk of the toroidal type continuously variable transmission is rotated at a speed based on a set transmission gear ratio.

The rotative driving force transmitted to said output side disk is transmitted to the third power transmitting shaft through the third and fourth gears, and rotates the fifth and sixth gears with the third power transmitting shaft.

As a result, the seventh gear which is in direct meshing engagement with the fifth gear is rotated in the direction opposite to the direction of rotation of said third power transmitting shaft, and the ninth gear which is in meshing engagement with the sixth gear through the eighth gear is rotated in the same direction as the direction of rotation of said third power transmitting shaft.

One of the rotative driving forces of the seventh and ninth gears is selectively transmitted to the fourth power transmitting shaft by the action of the second clutch means, whereby the fourth power transmitting shaft is rotated in a positive direction or in the opposite direction.

Further, the rotative driving force transmitted to the fourth power transmitting shaft is taken out by the power taking-out means, and rotates the wheels in a forward direction or a reverse direction and thereby moves the vehicle forward or backward.

The change-over of the forward movement and backward movement of the vehicle is accomplished by selecting the gear coupled to the fourth power transmitting shaft as the seventh gear or the ninth gear by the second clutch means, and the change-over of the transmission gear ratio is accomplished by changing the angle of inclination of a shaft supporting the power roller of the toroidal type continuously variable transmission which is provided between the second power transmitting shaft and a support shaft.

According to another principal aspect of the invention, a vehicle transmission may comprise a hollow casing, a power transmitting shaft rotatably supported in said casing for receiving an input rotative driving force; a toroidal type continuously variable transmission supported in said casing; first clutch means for coupling said power transmitting shaft to an input disk of said toroidal type continuously variable transmission; an additional power transmitting shaft rotatably supported in said casing and coupled through gear means to an output disk of said toroidal type continuously variable transmission; a further power transmitting shaft having a pair of gears rotatably mounted thereon; further gear means coupling one of said pair of gears to said additional power transmitting shaft for rotation in a first direction about said further power transmitting shaft and coupling the other of said pair of gears for rotation in an opposite direction about said further power transmitting shaft; second clutch means for alternatively coupling said one gear and said other gear to said further power transmitting shaft to effect rotation of said further power transmitting shaft in opposite directions, selectively; and control shaft means received in said casing and operable from outside said casing, and to which are mounted first link means for operating said first clutch means, second link means for operating said second clutch means, and third link means for adjusting a gear ratio of said toroidal type continuously variable transmission.

DESCRIPTION OF THE PREFERRED EMBODIMENT

Figure 1:
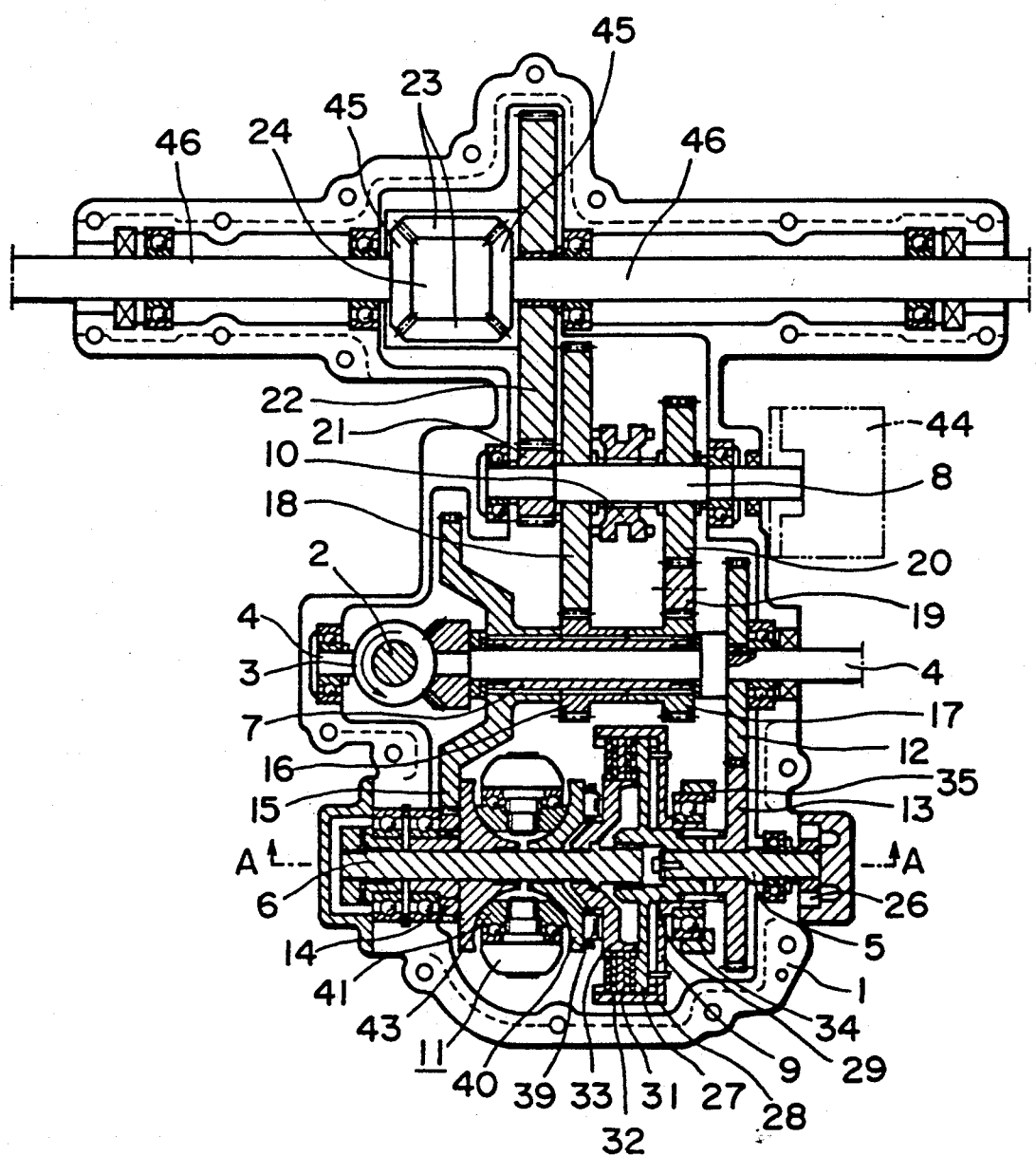
FIGS. 1 to 4 show an embodiment of the vehicle transmission of the present invention, FIG. 1 being a transverse plan view, FIG. 2 being a transverse plan view showing the lower portion of FIG. 1 on an enlarged scale, FIG. 3 being a cross-sectional view taken along line A—A of FIG. 1, and FIG. 4 being a cross-sectional view taken along line B—B of FIG. 3.

The invention will hereinafter be described in greater detail with respect to an embodiment thereof shown in the drawings, which illustrate a transmission for a riding-type lawn mower.

The illustrative vehicle transmission is comprised chiefly of a hollow casing 1, an input shaft 2, a gear assembly 3, parallel first to fourth power transmitting shafts 4, 5, 7, 8 provided in the casing 1, first and second clutch means 9 and 10, a toroidal type continuously variable transmission 11 having an input side disk 40, and an output side disk 41, first to ninth gears 12-20, tenth and eleventh gears 21 and 22, and a differential gear 24 with input side gears 23 supported on the eleventh gear 22.

Figure 4:
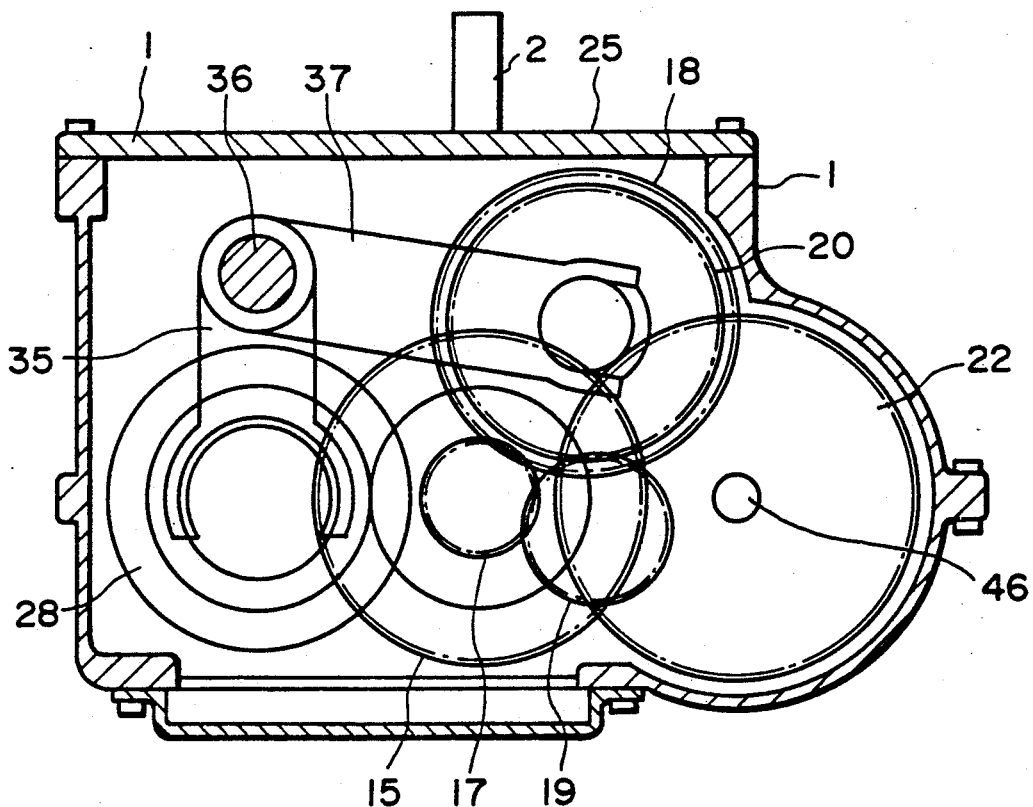

The input shaft 2, as shown in FIG. 4, is provided through the upper wall of the hollow casing 1, and that portion thereof which protrudes from the upper wall is coupled to the crank shaft of an engine so that the power of the engine may be introduced into the transmission.

The gear assembly 3 is constructed of a pair of bevel gears which are in meshing engagement with each other and is provided between the lower end portion of the input shaft 2 and the intermediate portion of the first power transmitting shaft 4. The shaft 4 is rotatably supported in the casing 1 by means of anti-friction bearings provided in the opposite end portions, and thus the transmission of a rotational driving force between the input shaft 2 and the first power transmitting shaft 4 disposed orthogonally to each other may be freely accomplished. As an alternative, the input shaft 2 and the first power transmitting shaft 4 may be disposed parallel to each other, and the gear assembly 3 may then be comprised of a plurality of spur gears or helical gears.

On the outer peripheral surface of one end portion (the right end portion as viewed in FIG. 1) of the first power transmitting shaft 4, the first gear 12 is fixed against rotation relative to the first power transmitting shaft 4 by key engagement. One end portion of the first power transmitting shaft 4 is protruded from a side of the casing 1 so as to provide a power take-off (PTO) point. Such a PTO point is utilized, for example, to provide a driving force to drive the rotational cutting edge for lawn mowing.

The second power transmitting shaft 5 is rotatably supported in the casing 1 also through antifriction bearings in parallelism to the first power transmitting shaft 4. On the outer peripheral surface of the intermediate portion of the second power transmitting shaft 5, the second gear 13 is mounted against rotation relative to the second power transmitting shaft 5, and the second gear 13 and the first gear 12 are brought into meshing engagement with each other so that the transmission of the rotative driving force between the first power transmitting shaft 4 and the second power transmitting shaft 5 may be freely accomplished.

A lubrication pump 26 is mounted on one end portion (the right end portion as viewed in FIGS. 1-2) of the above-described second power transmitting shaft 5 so that lubricating oil can be fed to the various components of the transmission as the second power transmitting shaft 5 is rotated.

A pressure plate 27 is fixed to the other end portion (the left end portion as viewed in FIGS. 1-2) of the second power transmitting shaft 5, and a bottomed short cylindrical clutch housing 28 is provided in such a manner as to surround the pressure plate 27. A cylindrical portion 48 provided centrally of the clutch housing 28 is fitted over a boss portion 29 formed on the central portion of the pressure plate 27, for sliding movement in the axial direction (the left to right direction as viewed in FIGS. 1-2). Compression springs 30 are provided between one side of the pressure plate 27 and the opposed inner side of the clutch housing 28. As long as an extraneous force does not act, the opposed sides of the pressure plate and clutch housing remain separate from each other so that the sides of first and second clutch disks 31 and 32 may bear against each other. In the case of the illustrated embodiment, a compression spring is provided between the boss portion 29 of the pressure plate 27 and the second gear 13, as shown, so as to impart a resilient force directed leftwardly as viewed in FIGS. 1-2 to the pressure plate 27.

The outer peripheral edges of first clutch disks 31 are serration-engaged with the inner peripheral surface of the clutch housing 28. On the other hand, the inner peripheral edges of second clutch disks 32 are serration-engaged with the outer peripheral edge of a loading cam 33 supported on the outer peripheral surface of one end portion (the right end portion as viewed in FIGS. 1-2) of a support shaft which will be described later. The first clutch disks 31 and second clutch disks 32 are alternately disposed, and when the sides of the disks 31 and 32 bear against each other due to the resilient forces of the compression springs 30, the transmission of power between the disks 31 and 32 takes place with a result that a rotative driving force is transmitted from the clutch housing 28 to the loading cam 33.

A release bearing 34 is fitted over a cylindrical portion 48 formed on the base end portion of the clutch housing 28, and by a first link 35 displaceable in the axial direction (the left to right direction as viewed in FIGS. 1-2), the release bearing 34 can be pressed (to the left as viewed in FIGS. 1-2) against the resilient forces of the compression springs 30. When the release bearing is pressed, the distance between one side of the pressure plate 27 and a stop ring 47 supported on the inner peripheral surface of the clutch housing 28 widens, whereby the sides of the first and second clutch disks 31 and 32 may separate from each other and the first clutch means 9 may be disconnected (the transmission of power from the clutch housing 28 to the loading cam 33 may not take place).

Figure 3:
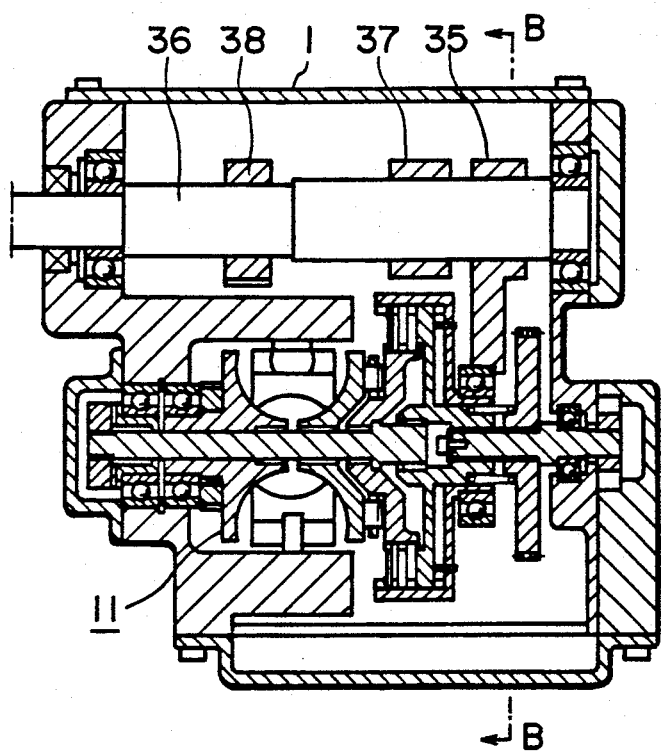

A mechanism for displacing such a first link 35 in the axial direction may be arranged as shown, for example, in FIGS. 3-4.

In FIGS. 3-4, the reference numeral 36 designates a control shaft rotatably supported in the casing 1. A cam slot (not shown) having a suitable shape is formed in the outer peripheral surface of this control shaft 36, and an engagement pin (not shown) projectedly provided on the inner peripheral edge portion of the first link 35 is loosely fitted in the cam slot. With such a construction, if the control shaft 36 is rotated in a suitable direction by a suitable angle from the outside of the casing 1, the first link 35 can be displaced in the axial direction (the left to right direction as viewed in FIG. 3) to thereby control the connection and disconnection of the first clutch means 9.

In addition to the first link 35 for connecting and disconnecting the first clutch means 9, a second link 37 for changing the transmission gear ratio of the toroidal type continuously variable transmission 11 (which will be described later) and a third link 38 for changing over the second clutch means 10 (which will also be described later) are supported on the control shaft 36 in similar fashion to the first link 35. Thus by suitably selecting the direction of rotation and the angle of rotation of the control shaft 36 (having three cam slots of suitable shapes in the outer peripheral surface thereof to loosely fit therein engagement pins projectedly provided on the inner peripheral surfaces of the first to third links 35, 37 and 38), it is possible to effect connection and disconnection or change-over of the first and second clutch means 9 and 10 and to effect adjustment of the transmission gear ratio of the toroidal type continuously variable transmission 11.

The toroidal type continuously variable transmission 11 having the input side disk 40 connectable to the second power transmitting shaft 5 through the aforedescribed first clutch means 9 is supported around a support shaft 6 provided in the casing 1 coaxial with the second power transmitting shaft 5. That is, one end (the right end as viewed in FIGS. 1-2) of this support shaft 6 is supported inside the boss portion 29 in the central portion of the pressure plate 27 through an antifriction bearing, and the other end of this support shaft 6 is supported relative to the housing 1 also through an antifriction bearing, as best seen in FIG. 2.

The toroidal type continuously variable transmission 11 is comprised of the input side disk 40 supported around the support shaft 6 and opposed to the loading cam 33 with rollers 39 interposed therebetween to thereby receive a rotative driving force from the loading cam 33, the output side disk 41 supported around the support shaft 6 through an antifriction bearing for rotation relative to the support shaft 6, and power rollers 43 rotatably supported on respective shafts 42 and interposed between the input side and output side disks 40 and 41. The sides of the input side and output side disks 40 and 41 which are opposed to each other are concave surfaces of arcuate cross-sectional shape and the peripheral surfaces of the power rollers 43 are spherical convex surfaces so that these peripheral surfaces and said sides may bear against each other. At least one of the loading cam 33 and the input side disk 40 is supported for rotation relative to the support shaft 6, whereby the loading cam 33 and the input side disk 40 are displaceable relative to each other.

In the case of such a toroidal type continuously variable transmission 11, with the rotation of the input side disk 40, the power rollers 43 rotate about the shafts 42, and the output side disk 41 is rotated by the power rollers 43. Where the shafts 42 supporting the respective power rollers 43 are perpendicular to the support shaft 6, the input side disk 40 and the output side disk 41 rotate at equal speeds, but where the shafts 42 and 42 are inclined with respect to the support shaft 6, the transmission gear ratio between the two disks 40 and 41 varies in conformity with the angle of inclination. The angle of inclination of the shafts 42 is adjusted by the second link 37 on the basis of the rotation of the aforedescribed control shaft 36. The toroidal type continuously variable transmission itself is known as disclosed, for example, in Japanese Laid-Open Utility Model Application No. 62-71465 and therefore need not be described in further detail.

The third gear 14 is fixed to the outer peripheral surface of the output side disk 41 of the toroidal type continuously variable transmission 11 by key engagement against rotation relative to the output side disk 41. The third gear 14 and the fourth gear 15, supported on the outer peripheral surface of the end portion of the third power transmitting shaft 7 by serration engagement, are brought into meshing engagement with each other.

The third power transmitting shaft 7 is formed into a hollow tubular shape as a whole, and is rotatably supported around the first power transmitting shaft 4 through an antifriction bearing. During operation of the transmission, the third power transmitting shaft 7 becomes rotatable independently of the first power transmitting shaft 4, around the first power transmitting shaft 4.

On the outer peripheral surface of the third power transmitting shaft 7, besides the fourth gear 15, the fifth gear 16 and the sixth gear 17 are supported by serration engagement against rotation relative to the third power transmitting shaft 7.

The fourth power transmitting shaft 8 is rotatably supported in the housing 1 in parallelism to the third power transmitting shaft 7 through antifriction bearings as shown, and one end portion (the right end portion as viewed in FIG. 1) of this fourth power transmitting shaft 8 is protruded out of the housing 1. A brake device 44 is provided on this protruded portion, and the rotation of the fourth power transmitting shaft 8 is suppressed by this brake device 44, whereby the braking of the vehicle can be effected by the transmission portion.

Around the fourth power transmitting shaft 8, the seventh gear 18 and the ninth gear 20 are supported for rotation relative to the fourth power transmitting shaft 8. The seventh gear 18 is in meshing engagement with the fifth gear 16, and the ninth gear 20 is in meshing engagement with the sixth gear 17 through the eighth gear 19.

A dog clutch which constitutes the second clutch means 10 is provided between the seventh and ninth gears 18 and 20 and the fourth power transmitting shaft 8, and one of the seventh gear 18 and the ninth gear 20 can be freely coupled to the fourth power transmitting shaft 8. The change-over of this second clutch means 10 is effected by the third link 38 on the basis of the rotation of the control shaft 36.

The power taking-off means for taking out the power from the transmission for delivery to driving wheels of the vehicle is comprised of the tenth gear 21 fixed to the fourth power transmitting shaft 8, the eleventh gear 22 which is in meshing engagement with the tenth gear 21, a differential gear 24 with input side gears 23 supported on the eleventh gear 22, and a pair of output shafts 46 having respective ends fixed to a pair of output side gears 45 of the differential gear 24. Driving wheels (not shown) are provided on the other end portions of the pair of output shafts 46 so that the vehicle, such as a lawn mower, incorporating the transmission of the present invention can be moved at any speed.

The vehicle transmission of the present invention constructed as described above operates as will be described below.

The rotative driving force transmitted from an engine (not shown) provided above the transmission to the input shaft 2 is transmitted to the first power transmitting shaft 4 through the gear assembly 3 provided between the lower end portion of the input shaft 2 and the first power transmitting shaft 4. The rotational cutting edge or the like for lawn mowing is driven by power taken out from the PTO point provided at one end portion of the first power transmitting shaft 4.

The rest of the power transmitted from the input shaft 2 to the first power transmitting shaft 4 is transmitted to the second power transmitting shaft 5 through the first and second gears 12 and 13 to rotate the second power transmitting shaft 5.

The rotative driving force thus transmitted to the second power transmitting shaft 5 is further transmitted to the pressure plate 27 of the first clutch means 9. The pressure plate 27 and the first clutch disks 31 are serration-fitted to the inner peripheral surface of the clutch housing 28, as previously described, and therefore, with the rotation of the pressure plate 27, the first clutch disks 31 are rotated at the same speed. During the connection of the clutch, i.e., when the clutch housing 28 is not pressed to the left as viewed in FIGS. 1-2 by the first link 35, the sides of the first clutch disks 31 bear against the sides of the second clutch disks 32 by the resilient forces of the compression springs 30 provided between the clutch housing 28 and the pressure plate 27, and the loading cam 33 supporting the second clutch disks 32 rotates in synchronism with the second power transmitting shaft 5.

Figure 2:
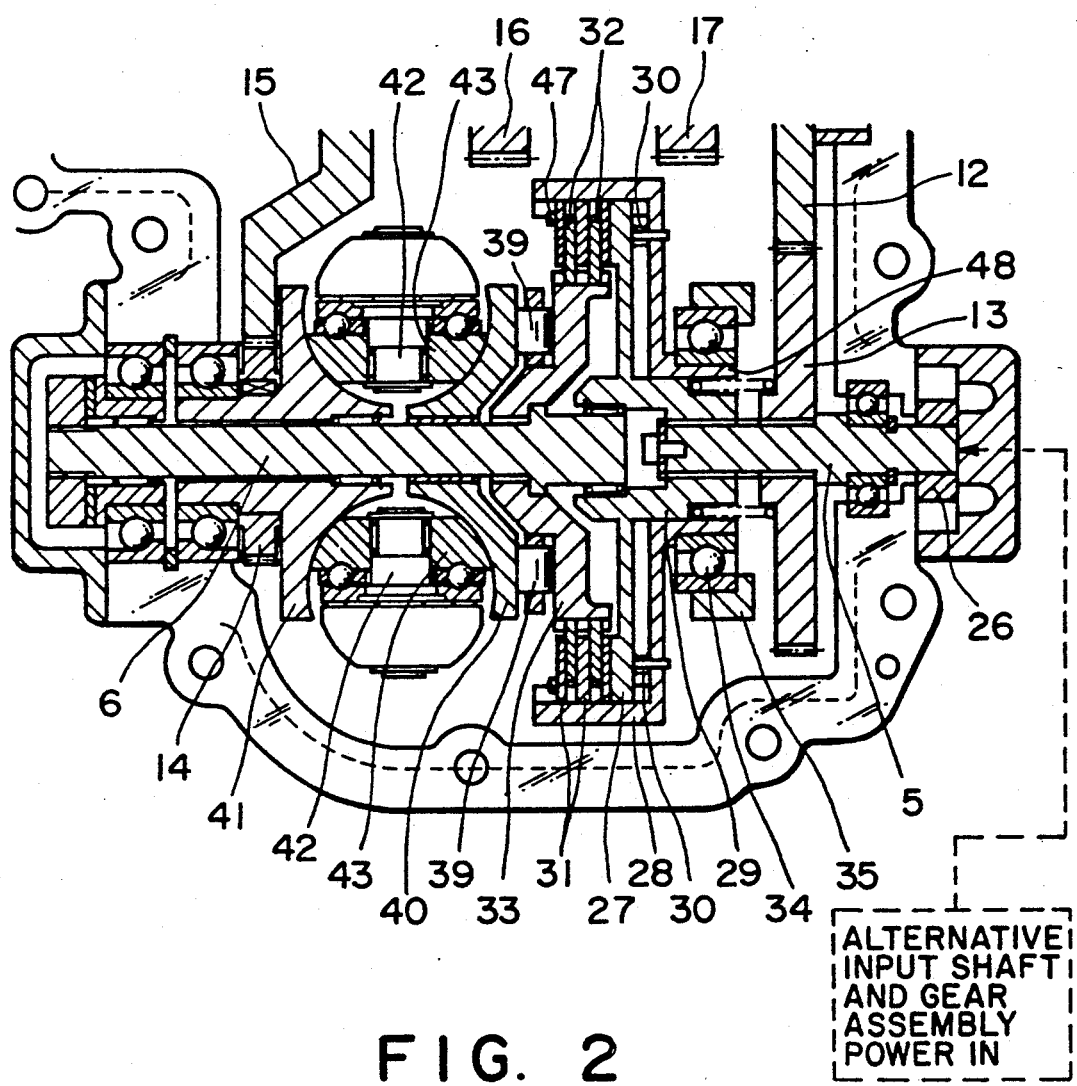

When the first clutch means 9 is to be disconnected to stop the movement of the vehicle, the first link 35 is moved to the left as viewed in FIGS. 1-3 on the basis of the rotation of the control shaft 36 (see FIGS. 3-4), and the clutch housing 28 is pressed (to the left as viewed in FIGS. 1-3 against the resilient forces of the compression springs 30) through the release bearing 34. As a result, a gap is created between the sides of the first and second clutch disks 31 and 32 and thus, no transmission of power takes place between the two disks 31 and 32 and the loading cam 33 is stopped.

When the first clutch means 9 is in its connected state, the rotative driving force transmitted from the second power transmitting shaft 5 to the loading cam 33 is further transmitted to the input side disk 40 of the toroidal type continuously variable transmission 11 through the rollers 39 to rotate the input side disk 40 about the support shaft 6. More particularly, the surfaces of the loading cam 33 and the input side disk 40 which are opposed to each other are uneven cam surfaces, and therefore, with the rotation of the loading cam 33, the rollers 39 rotate the input side disk 40 while pressing it to the left as viewed in FIGS. 1-2.

With the rotation of input side disk 40, the power rollers 43 of the toroidal type continuously variable transmission 11 rotate about the shafts 42 and further, the rotation of the power rollers 43 is transmitted to the output side disk 41, which is thus rotated at a speed based on the transmission gear ratio determined in conformity with the angle of inclination of the shafts 42.

When the transmission gear ratio of the toroidal type continuously variable transmission 11 is to be changed, the second link 37 is moved by a suitable amount in a suitable direction on the basis of the rotation of the control shaft 36 (see FIGS. 3-4) to thereby change the angle of inclination of the shafts 42 supporting the power rollers 43.

The rotative driving force transmitted to the output side disk 41 of the toroidal type continuously variable transmission 11 as described above is further transmitted through the third and fourth gears 14 and 15 to the tubular third power transmitting shaft 7 provided around the first power transmitting shaft 4 to rotate the fifth and sixth gears 16 and 17 supported on the outer periphery of the third power transmitting shaft 7 by serration engagement.

As a result, the seventh gear 18 which is in direct meshing engagement with the fifth gear 16 is rotated in the direction opposite to the direction of rotation of the third power transmitting shaft 7, and the ninth gear 20 which is in meshing engagement with the sixth gear 17 through the eighth gear 19 is rotated in the same direction as the direction of rotation of the third power transmitting shaft 7.

The seventh gear 18 and the ninth gear 20 are both supported around the fourth power transmitting shaft 8 for rotation relative to the fourth power transmitting shaft 8

By the action of the dog clutch constituting the second clutch means 10 provided between the fourth power transmitting shaft 8 and the seventh and ninth gears 18 and 20, only one of the seventh gear 18 and the ninth gear 20 is selectively coupled to the fourth power transmitting shaft 8. Thus, the fourth power transmitting shaft 8 is rotated in a direction depending on the state of the second clutch means.

When the vehicle is to be moved backward, the second clutch means 10 is changed over to a state for coupling the fourth power transmitting shaft 8 and the ninth gear 20 together. As a result, the fourth power transmitting shaft 8 is rotated in the same direction as the direction of rotation of the third power transmitting shaft 7.

When the vehicle is to be moved forward, the second clutch means 10 is changed over to a state for coupling the fourth power transmitting shaft 8 and the seventh gear 18 together. As a result, the fourth power transmitting shaft 8 is rotated in the direction opposite to the direction of rotation of the third power transmitting shaft 7.

Preferably, the cam slot arrangement in the outer peripheral surface of the control shaft 36 is designed so that the first clutch means 9 is disconnected at the moment when the second clutch means 10 comprised of a dog clutch is disconnected, whereby the work of connecting the second clutch means 10 is done easily and smoothly.

The rotative driving force transmitted to the fourth power transmitting shaft 8 in the manner described above is further transmitted through the tenth and eleventh gears 21 and 22 to the input side gears 23 of the differential gear 24. This force is further transmitted from the output side gears 45 of the differential gear 24 to the pair of output shafts 46 to rotate the wheels fixed to the outer end portions of the output shafts 46, thus moving the vehicle forward or backward.

When the vehicle is to be braked, the brake device 44 provided on one end portion of the fourth power transmitting shaft 8 is operated to stop the rotation of the fourth power transmitting shaft 8. Because the fourth power transmitting shaft 8 and the wheels are connected together through the tenth and eleventh gears 21 and 22, the differential gear 24 and the output shafts 46 when the rotation of the fourth power transmitting shaft 8 is stopped by the brake device 44, the braking of the vehicle is accomplished. Since the illustrative transmission is used in a light vehicle, such as a lawn mower for riding, which is light in weight and which runs at a low speed, the braking of the vehicle can be sufficiently accomplished by such a brake device.

In the case of the above-described embodiment, there is provided a PTO point to enable driving of a cutting blade, for example. Hence, the power of the input shaft 2 is initially transmitted to the first power transmitting shaft 4, which provide the PTO point, and then it is transmitted to the second power transmitting shaft 5 by the first and second gears 12 and 13, and ultimately thereafter to the driving wheels. It is apparent, of course, that the PTO point need not be provided, in which case the first power transmitting shaft 4 and the first and second gears 12 and 13 can be eliminated and the power can be transmitted from the input shaft 2 and gear assembly 3 directly to the second power transmitting shaft 5 as indicated diagrammatically in FIG. 2.

Further, instead of using the input shaft 2 and the gear assembly 3, the opposite end portions of the first power transmitting shaft 4 can be protruded out of the casing 1, and one end of this first power transmitting shaft 4 can then be used for PTO and the other end thereof can be made connectable to the crank shaft of the engine.

Because the vehicle transmission of the present invention incorporates a toroidal type continuously variable transmission, it offers good operability, responsiveness, durability, and efficiency, and it can thus enhance the operability and running characteristics of a vehicle.

I claim:

1. A vehicle transmission comprising a hollow casing; a first power transmitting shaft rotatably supported in said casing for receiving an input rotative driving force; a second power transmitting shaft rotatably supported in said casing in parallelism to said first power transmitting shaft; a first gear supported on the outer peripheral surface of said first power transmitting shaft against rotation relative to said first power transmitting shaft and meshing with a second gear first gear; supported on an outer peripheral surface of said second power transmitting shaft against rotation relative to said second power transmitting shaft; a toroidal type continuously variable transmission supported in said casing coaxially with said second power transmitting shaft; first clutch means provided between an input side disk of said toroidal type continuously variable transmission and said second power transmitting shaft; a third power transmitting shaft rotatably supported in said casing in parallelism to a center of rotation of an output side disk of said toroidal type continuously variable transmission; a third gear supported on said output side disk of said toroidal type continuously variable transmission against rotation relative to said output side disk and meshing with a fourth gear supported on an outer peripheral surface of said third power transmitting shaft against rotation relative to said third power transmitting shaft; fifth and sixth gear supported on the outer peripheral surface of said third power transmitting shaft against rotation relative to said third power transmitting shaft; a fourth power transmitting shaft rotatably supported in said casing in parallelism to said third power transmitting shaft; a seventh gear supported around said fourth power transmitting shaft for rotation relative to said fourth power transmitting shaft and meshing with said fifth gear; an eighth gear; a ninth gear supported around said fourth power transmitting shaft for rotation relative to said fourth power transmitted shaft and meshing with said sixth gear through said eighth gear; second clutch means provided between said fourth power transmitting shaft and said seventh and ninth gears for alternatively coupling said seventh and ninth gears with said fourth power transmitting shaft; and power taking-off means for taking out rotative driving force from said fourth power transmitting shaft.

2. A vehicle transmission according to claim 1, wherein said third power transmitting shaft is a tubular hollow shaft disposed concentrically about said first power transmitting shaft.

3. A vehicle transmission according to claim 1, wherein said power taking-off means includes a tenth gear supported on said fourth power transmitting shaft against rotation relative to said fourth power transmitting shaft; an eleventh gear meshing with said tenth gear; a differential gear having an input side gear supported on said eleventh gear; and a pair of output shafts each having one end portion fixed to a respective one of a pair of output side gears of said differential gear.

4. A vehicle transmission according to claim 1, wherein one end of said first power transmitting shaft is protruded out of said casing to provide a power taking-off point.

5. A vehicle transmission according to claim 4, an opposite end of said first power transmitting shaft is protruded out of said casing for connection to a crank shaft of an engine.

6. A vehicle transmission according to claim 1, wherein an end portion of said fourth power transmitting shaft is protruded out of said casing, and including brake means cooperable with said protruded portion for braking rotation of said fourth power transmitting shaft.

7. A vehicle transmission according to claim 1, wherein a control shaft operable from the outside of said casing is received in said casing, and connection and disconnection of said first and second clutch means and the adjustment of a transmission gear ratio of said toroidal type continuously variable transmission are effected by first, second and third links disposed axially of said control shaft with rotation of said control shaft.

8. A vehicle transmission according to claim 1, wherein said first power transmitting shaft is coupled through a gear assembly to an input shaft received in said casing and providing said input rotative driving force to said first power transmitting shaft.

9. A vehicle transmission comprising a hollow casing; a power transmitting shaft rotatably supported in said casing for receiving an input rotative driving force; a toroidal type continuously variable transmission supported in said casing coaxially with said power transmitting shaft; first clutch means provided between an input side disk of said toroidal type continuously variable transmission and said power transmitting shaft; an additional power transmitting shaft rotatably supported in said casing in parallelism to a center of rotation of an output side disk of said toroidal type continuously variable transmission; a gear supported on said output side disk of said toroidal type continuously variable transmission against rotation relative to said output side disk and meshing with a gear supported on an outer peripheral surface of said additional power transmitting shaft against rotation relative to said additional power transmitting shaft; a pair of additional gears supported on the outer peripheral surface of said additional power transmitting shaft against rotation relatie to said additional power transmitting shaft; a further power transmitting shaft rotatably supported in said casing in parallelism to said additional power transmitting shaft; two gears supported around said further power transmitting shaft for rotation relative to said further power transmitting shaft, one of said two gear meshing with one of said pair of additional gears and the other of said two gears meshing with the other of said pair of additional gears through an intermediate gear; second clutch means provided between said two gears for alternatively coupling said two gears with said further power transmitting shaft; and power taking-off means for taking out rotative driving force from said further power transmitting shaft.

10. A vehicle transmission according to claim 9, including an input shaft coupled to the first-mentioned power transmitting shaft through a gear assembly.

11. A vehicle transmission comprising a hollow casing, a power transmitting shaft rotatably supported in said casing for receiving an input rotative driving force; a toroidal type continuously variable transmission supported in said casing; first clutch means for coupling said power transmitting shaft and an input disk of said toroidal type continuously variable transmission; an additional power transmitting shaft rotatably supported in said casing and coupled through gear means to an output disk of said toroidal type continuously variable transmission; a further power transmitting shaft having a pair of gears rotatably mounted thereon; further gear means coupling one of said pair of gears to said additional power transmitting shaft for rotation in a first direction about said further power transmitting shaft and coupling the other of said pair of gears for rotation in a opposite direction about said further power transmitting shaft; and second clutch means for alternatively coupling said one gear and said other gear to said further power transmitting shaft to effect rotation of said further power transmitting shaft in opposite directions, selectively; and control shaft means received in said casing and operable from outside said casing, and to which are mounted first link means for operating said first clutch means, second link means for operating said second clutch means, and third link means for adjusting a gear ratio of said toroidal type continuously variable transmission.

12. A vehicle transmission according to claim 11, further comprising power taking-off means for taking out rotative driving force from said further power transmitting shaft.

13. A vehicle transmission according to claim 12, wherein said power taking-off means includes a pair of drive shafts coupled to said further power transmitting shaft through differential gear means.

14. A vehicle transmission according to claim 11, wherein the first-mentioned gear means includes a gear fixed relative to said output disk of said toroidal type continuously variable transmission for rotation with said output disk and a gear mounted on said additional power transmitting shaft for rotation therewith.

15. A vehicle transmission according to claim 11, wherein said further gear means includes a gear mounted on said additional power transmitting shaft and meshing with said one of said pair of gears mounted on said further shaft, and a gear mounted on said additional power transmitting shaft and meshing with said other of said pair of gears through an intermediate gear.

16. A vehicle transmission according to claim 11, wherein the first-mentioned power transmission shaft receives said input rotative driving force from another further power transmitting shaft coupled to said first-mentioned shaft through gear means.

17. A vehicle transmission according to claim 16, wherein said another further power transmitting shaft has an end portion protruding through said casing to provide a power taking-off point.

18. A vehicle transmission according to claim 16, wherein said additional power transmitting shaft is disposed concentrically about said another further power transmitting shaft.

19. A vehicle transmission according to claim 18, wherein said another further power transmitting shaft has an end portion protruding through said casing to provide a power taking-off point.

20. A vehicle transmission according to claim 16, including an input shaft received in said casing and coupled to said another further power transmitting shaft by a gear assembly.

21. A vehicle transmission according to claim 11, wherein said toroidal type continuously variable transmission is disposed coaxially with the first-mentioned power transmitting shaft, and wherein said additional and further power transmission shafts are parallel to said first-mentioned power transmitting shaft.

22. A vehicle transmission according to claim 21, wherein said control shaft means is parallel to all of said power transmitting shafts, and wherein said first, second, and third link means are displaceable axially of said control shaft means to operate said first and second clutch means and to adjust the gear ratio of said toroidal type continuously variable transmission as aforesaid.

23. A vehicle transmission according to claim 22, wherein the axial displacement of said first, second, and third link means is effected by rotation of said control shaft means.

* * * * *